United States Patent [19]

Ohshita

[11] Patent Number: 5,005,955
[45] Date of Patent: Apr. 9, 1991

[54] KEPLERIAN ZOOM FINDER OPTICAL SYSTEM

[75] Inventor: Koichi Ohshita, Kawasaki, Japan

[73] Assignee: Nikon Corporation, Tokyo, Japan

[21] Appl. No.: 421,765

[22] Filed: Oct. 16, 1989

[30] Foreign Application Priority Data

Oct. 18, 1988 [JP] Japan ................. 63-262209

[51] Int. Cl.$^5$ ............ G02B 15/14; G02B 13/18; G03B 13/02

[52] U.S. Cl. .................. 350/423; 350/427; 350/432; 354/219; 354/222; 354/225

[58] Field of Search ........ 350/423, 426, 427, 432–435; 354/219, 222, 225

[56] References Cited

U.S. PATENT DOCUMENTS 4,842,395  6/1989  Sato et al. ..................... 350/425

FOREIGN PATENT DOCUMENTS 61-156018  7/1986  Japan .
62-7017    1/1987  Japan .
63-148228  6/1988  Japan .
1-233430   9/1989  Japan .

Primary Examiner—Scott J. Sugarman
Attorney, Agent, or Firm—Shapiro and Shapiro

[57] ABSTRACT

A Keplerian zoom finder optical system having a zoom power variable objective lens, the Keplerian zoom finder optical system comprising: a zoom objective lens including a first lens group having a negative refracting power and a second lens group including at least a positive meniscus lens whose convex surface faces an image and having a positive refracting power, the lens group being moved for the purpose of conducting the zoom power variation; and an ocular used for enlarging and observing the image formed by the zoom objective lens, wherein when a focal length of the first lens group is $f_1$, a focal length of the second lens group is $f_2$, and a curvature radius of the convex surface of the positive meniscus lens is $r_a$, the following conditions are met:

$$0.8 < \frac{|f_1|}{f_2} < 1.4 \ (f_1 < 0)$$

$$0.1 < \frac{|r_a|}{f_2} < 1.4 \ (r_a < 0)$$

15 Claims, 5 Drawing Sheets

KEPLERIAN ZOOM FINDER OPTICAL SYSTEM

BACKGROUND OF THE INVENTION

1. Field of the Invention

The present invention relates to a power-variable finder optical system, and, more particularly, to a Keplerian zoom finder optical system including a power-variable zoom objective lens.

2. Related Background Art

Finder optical systems are classified into the inverted Galilean virtual image finder, with which a virtual image enlarged by an objective lens can be observed, and the Keplerian finder, with which an intermediate image formed by an objective lens and enlarged by an ocular can be observed.

The virtual image finder exhibits a simple structure and a reduced cost. However, it involves the disadvantage of an unclear boundary of the visual field thereof.

On the other hand, although the Keplerian finder is disadvantageous of the slight complexity of its structure, it is advantageous in function since the visual field can be clarified by disposing a field diaphragm on the focal plane of the objective lens thereof.

In recent years, camera finders of a type capable of continuously varying in their variable power have been required during the progressive improvement of multi focal points imaging lenses for lens shutter type cameras. A variety of disclosures have been made about the virtual image zoom finder. For example, the disclosure disclosed by the applicant of the present invention in Japanese Patent Laid-Open No. 63-148228 achieved a sufficiently wide visual angle of 54° at the wide angle end thereof and an excellent variable power of 2.5 to 3.0 times.

Some disclosures have also been made on the Keplerian zoom finder as disclosed in Japanese Laid-Open No. 61-156018, Japanese Patent Laid-Open No. 62-7017, and the like.

However, the conventional Keplerian zoom finder suffers from a relatively narrow visual field of about 50° at the wide angle end thereof and poor variable power of two times or less. Therefore, the conventional Keplerian zoom finder is not used often since it cannot keep abreast of the trend for a winder angle in the imaging lens and a higher variable power.

In the Keplerian finder, the objective lens thereof and the ocular thereof must be individually subjected to aberration correction in order to make the visual field clear. Therefore, although a conventional imaging zoom lens may be utilized as the zoom objective lens for the Keplerian zoom finder, the complicated structure of the imaging zoom lens renders it unipreferable use as the zoom objective lens for a finder which must be simplified in structure and be reduced in size.

SUMMARY OF THE INVENTION

To this end, an object of the invention is to improve the structure of the zoom objective lens in a Keplerian zoom finder optical system. Therefore, there is provided a high performance Keplerian zoom finder optical system whose the structure can still be simplified and whose size can still be reduced. This Keplerian zoom finder optical system can be realized by so arranging the structure as to have a zoom objective lens exhibiting a wide field angle which exceeds 53°, an excellent variable power of two times or more, and a satisfactorily imaging performance from the wide angle end to the telephoto end the structure of which is still simplified.

In order to achieve the above-described object, there is provided a Keplerian finder optical system whose objective lens is a zoom objective lens including a first lens group $G_1$ having a negative refracting power and a second lens group $G_2$ having a positive refracting power whereby zooming is conducted by changing a distance between the first lens group $G_1$ and the second lens group $G_2$, the zoom objective lens being arranged such that a positive meniscus lens whose convex surface faces an image is positioned at the most adjacent position to the image among the lenses in the second lens group $G_2$.

According to the structure thus formed, provided that the focal length of the first lens group $G_1$ is $f_1$, the focal length of the second lens group $G_2$ is $f_2$, and the radius of curvature of the surface of the positive meniscus lens adjacent to the object is $r_a$, the following conditions are satisfied:

$$0.8 < \frac{|f_1|}{f_2} < 1.4 \ (f_1 < 0) \tag{1}$$

$$0.1 < \frac{|r_a|}{f_2} < 1.4 \ (r_a < 0) \tag{2}$$

According to the present invention, a high performance Keplerian finder optical system of a simple structure and reduced size can be realized with a zoom objective lens of simple structure and a reduced number of lenses thereof but that is capable of satisfactorily correcting various aberrations from the wide angle end to the telephoto end and that exhibits a high zoom ratio.

Furthermore, since the lens of the finder system can be made of plastic or the like, it is advantageous in terms of weight and cost reduction.

The structure of the zoom objective lens of the Keplerian finder according to the present invention can be applied to an imaging optical system by being subjected to a slight change.

Other objects, features, and effects of the invention will be apparent from the following detailed description given in connection with the accompanying drawings.

DESCRIPTION OF THE PREFERRED EMBODIMENTS

Embodiments of the present invention will now be described in detail with reference to the accompanying drawings.

Figure 1:
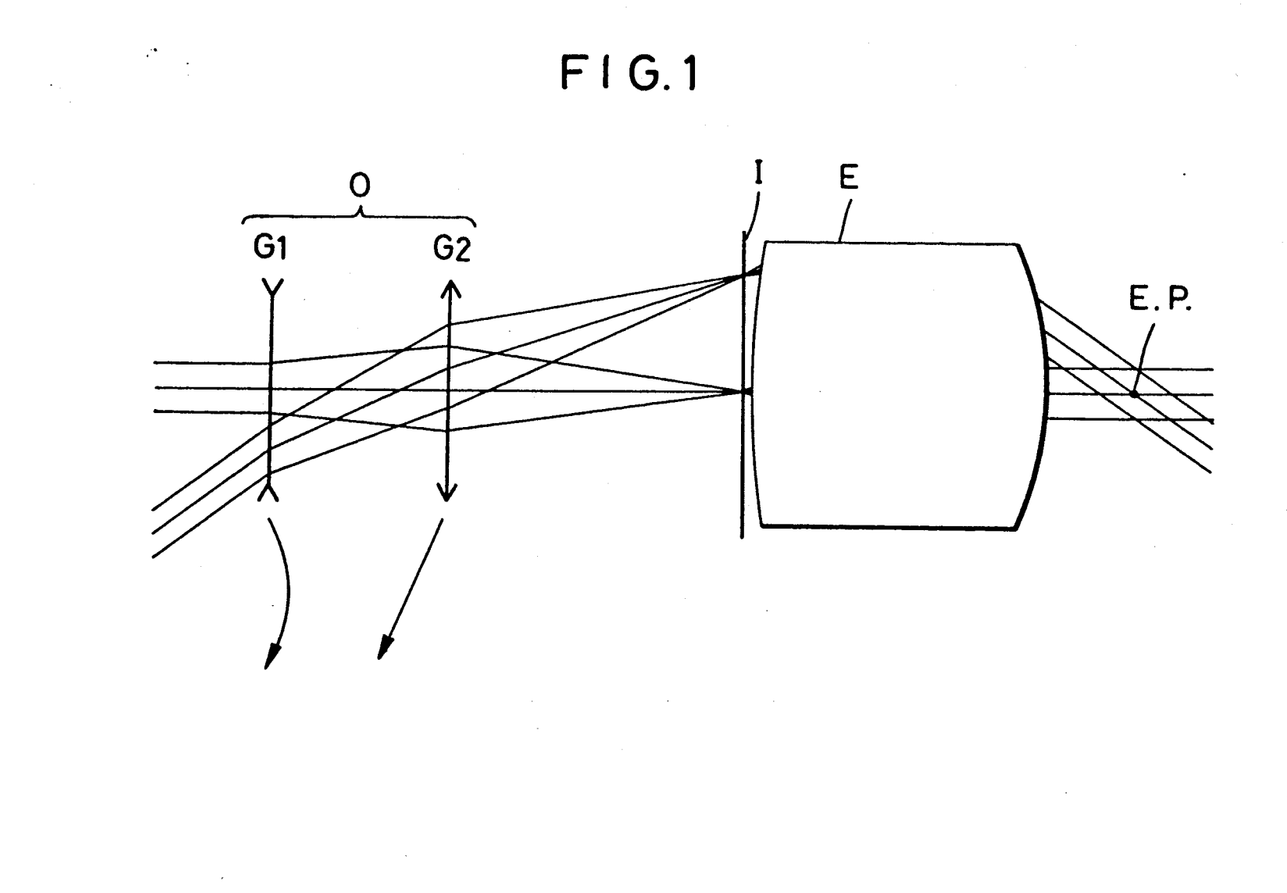
FIG. 1 is a view which illustrates a schematic structure of a Keplerian zoom finder optical system according to the present invention, the Keplerian zoom finder optical system having a zoom objective lens formed by a positive and a negative lens groups.

Referring to FIG. 1, symbol O represents a zoom objective lens, $G_1$ and $G_2$ represent its first and second lens groups, reference numeral 1 represents an intermediate image formed by the zoom objective lens O. Symbol E represents an ocular, and E.P. represents an eyepoint. As shown in FIG. 1, zooming from a wide angle end to a telephoto end is conducted in such a manner that the first lens group $G_1$ is so moved as to form a convex path projecting toward the image while the second lens group $G_2$ is moved toward the object. As a result, a power-varied and thereby enlarged intermediate image formed on a surface I can be observed at the position of the E.P. via the ocular E.

Figure 2:
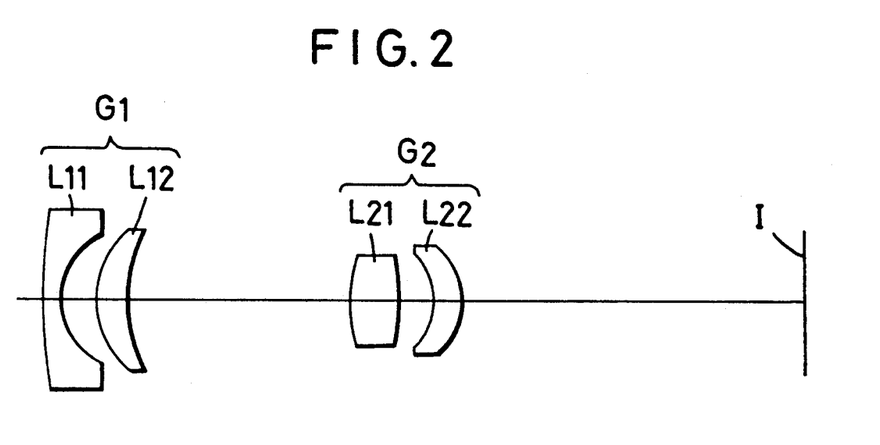
FIGS. 2 and 3 are cross-sectional views which respectively illustrate a first embodiment and a second embodiment of the zoom objective lens formed by a positive and a negative lens groups according to the present invention.

Specifically, the zoom objective lens having a function of forming a clear image comprises, as shown in FIG. 2, the first lens group $G_1$ consisting of a negative meniscus lens $L_{11}$ arranged such that the strong concave surface thereof is faced toward the intermediate image I and a positive meniscus lens $L_{12}$ whose convex surface is faced toward the object and the second lens group $G_2$ consisting of both-side convex lens $L_{21}$ and a meniscus lens $L_{22}$ whose convex surface is faced toward the intermediate image I.

In the above-described Keplerian zoom finder optical system according to the present invention, luminous flux from an object is caused to form an intermediate image by a zoom objective lens O consisting at least two lens groups, that is, a positive lens group and a negative lens group. The image thus formed is then introduced into the eyepoint EP by the ocular E. The power-varied and thereby enlarged intermediate image from the wide angle end to the telephoto end can be observed at the eyepoint by way of relatively changing the distance between the positive lens group and the negative lens group of the zoom objective lens.

As described above, in order to observe a clear intermediate image at the eyepoint, the Keplerian finder optical system must be subjected to an aberration correction to be conducted such that the objective lens O and the ocular E are individually aberration-corrected. Therefore, in a Keplerian zoom finder optical system of the type according to the present invention, the intermediate image I formed by the zoom objective lens O must be satisfactorily aberration-corrected from the wide angle end to the telephoto end so as to be a clear intermediate image.

Therefore, the Keplerian zoom finder optical system according to the present invention comprises: the zoom objective lens O consisting of at least the negative first lens group $G_1$ and a positive second lens group $G_2$ which are relatively moved to each other so as to change the distance therebetween for the purpose of conducting zoom power-variation; and the ocular E capable of enlarging and observing the image of an object formed by the above-described zoom objective lens O. The second lens group $G_2$ includes the positive meniscus lens $L_{22}$ having at least a convex surface facing the intermediate image I at the most adjacent position to the intermediate image I. Provided that the focal length of the first lens group $G_1$ is $f_1$, the focal length of the second lens group $G_2$ is $f_2$, the radius of curvature of the positive meniscus lens $L_{22}$ at its surface adjacent to an object is $r_a$, the zoom objective lens O is so formed as to meet the following conditions:

$$0.8 < \frac{|f_1|}{f_2} < 1.4 \; (f_1 < 0) \quad (1)$$

$$0.1 < \frac{|r_a|}{f_2} < 1.4 \; (r_a < 0) \quad (2)$$

The thus formed structure according to the present invention realizes a high performance Keplerian zoom finder optical system of a reduced size by forming a zoom objective lens exhibiting a high zoom ratio but having a simple structure, the zoom objective lens being capable of satisfactorily conducting aberration correction from the wide angle end to the telephoto end.

Now a description will be given regarding the above-described conditional formulas (1) and (2).

The condition (1) defines the most suitable magnification for the second lens group $G_2$ by arranging to be suitable the ratio of the focal length of the first lens group $G_1$ and that of the second lens group $G_2$. If a ratio exceeds the upper limit defined in this conditional formula (1), the magnification of the second lens group $G_2$ at the wide angle end is lowered, causing the overall size of the finder to become difficult to be reduced. On the contrary, if the ratio is lowered below the lower limit, the magnification of the second lens group $G_2$ at the telephoto end is raised. This leads to the fact that comatic aberration is difficult to be conducted when the position of the eyepoint E is intended to be made constant.

The condition (2) defines the most suitable radius of curvature of the surface of the positive meniscus lens $L_{22}$ facing an object, the meniscus lens $L_{22}$ being disposed at the most near position to the image I among the lenses in the second lens group $G_2$ and having a convex surface facing the image I. If a ratio exceeds the upper limit defined in the conditions (2), distortion and comatic aberration cannot be corrected easily at the wide angle end. If a ratio is lowered below the lower limit, it becomes difficult to maintain the eyepoint E at the same position. Furthermore, the curvature of the positive meniscus lens $L_{22}$ is caused to be raised at its surface facing an object, causing a higher aberration to be generated. As a result, spherical aberration and comatic aberration at the telephoto end cannot be corrected easily. Therefore, it is preferable that the lower limit of the condition (2) be 0.2.

It is preferable that the both side convex lens $L_{21}$ be disposed more adjacent to an object than the positive meniscus lens $L_{22}$ of the second lens group $G_2$. Furthermore, it is preferable that power be so distributed that the both side convex lens $L_{21}$ bears the major portion of the positive power (refracting power). This leads to the fact that the distortion and the comatic aberration can be satisfactorily corrected which have been difficult to be individually corrected in each of the groups.

It is further preferable that the following conditions be met:

$$0 < \frac{f_2}{f_a} < 0.4 \quad (3)$$

$$0 < \frac{r_b}{|r_c|} < 1.2 \quad (r_c < 0) \quad (4)$$

where $f_2$: the focal length of the second lens group $f_a$: the focal length of the positive meniscus lens of the second lens group $r_b$: the curvature radius of the surface of the two side convex lens of the second lens group, the surface facing an object $r_c$: the curvature radius of the surface of the two side convex lens of the second lens group, the surface facing an image The condition (3) defines a suitable focal length for the positive meniscus lens $L_{22}$ disposed at the most adjacent position to the image among the lenses in the second lens group $G_2$ and having the convex surface thereof facing the image. The fact that the ratio exceeds the upper limit defined in this conditions (3) can be considered to be advantageous in terms of correcting the aberration from the viewpoint of uniform distribution of the positive refracting power. However, the curvature of the surface of the positive meniscus lens $L_{22}$ facing the image becomes excessive when the condition (2) is taken into consideration, causing the correction of higher aberration to become difficult. Furthermore, since principal points of the second lens group $G_2$ is, in this case, caused to be shifted toward the image, the reduction in size of the objective lens system becomes difficult. If the ratio is lowered below the lower limit, although it is advantageous to reduce the size of the objective lens system, it is disadvantageous to correct the various aberrations since the refracting power of the two side convex lens $L_{21}$ of the second lens group $G_2$ needs to be improved.

The condition (4) defines a proper ratio between the curvature radius of the surface of the two side convex lens $L_{21}$ of the second lens group $G_2$ facing an object and that of the surface of the same facing the image so as to minimize generation of the spherical aberration on the two side convex lens $L_{21}$. If the ratio is out of the upper limit or the lower limit of the condition (4), it is disadvantageous since the spherical aberration generates excessively.

In the case where the second lens group $G_2$ is formed by the two side convex lens $L_{21}$ and only the positive meniscus lens $L_{22}$, it is preferable that the surface of the positive meniscus lens $L_{22}$ be formed by an aspheric surface whose curvature is lowered in accordance with the increase in the distance from the optical axis.

Provided that the vertical height from the optical axis is y, the distance at y from the apex of the aspheric surface to the contact plane along the optical axis is $x(y)$, the reference curvature radius is R, the conical constant is k, the n-th aspheric surface coefficient is An, the aspheric surface of the aspherical lens is expressed as follows:

$$x(y) = \frac{y^2/R}{1 + \sqrt{(1 - k \cdot y^2/R^2)}} + A2 \cdot y^2 + A3 \cdot |y^3| +$$

$$A4 \cdot y^4 + A5 \cdot |y|^5 + A6 \cdot y^6 + A7 \cdot |y|^7 + A8 \cdot y^8 + A9 \cdot |y|^9 + A10 \cdot y^{10} + , \ldots$$

For this condition paraxial curvature radius is defined as follows:

$$r = \frac{1}{(1/R) + 2 \cdot A2}$$

Therefore, it is preferable that the aspheric surface of the above-described positive meniscus lens $L_{22}$ facing the image be so arranged as to meet the following condition:

$$0 < \frac{x_g(y)}{r_g} < 0.0316 \text{ (where } y = 0.25 \ r_g) \quad (5)$$

where $r_g$: the paraxial curvature radius of the surface of the positive meniscus lens facing the image, the positive meniscus lens being positioned at the most adjacent position to the image among the lenses of the second lens group $x_g(y)$: the distance measured at the aspheric surface of the positive meniscus lens facing the image, the positive meniscus lens being positioned at the most adjacent position to the image among the lenses of the second lens group $R_g$: the reference curvature of the surface of the positive meniscus lens facing the image, the positive meniscus lens being positioned at the most adjacent position to the image among the lenses of the second lens group $$r_g = \frac{1}{(1/R_g) + 2 \cdot A2}$$

If a ratio exceeds the upper limit defined in the conditional formula (5), the effect of the aspheric surface is deteriorated. If the same is lowered below the lower limit, the effect of the aspheric surface becomes excessive. In either case, spheric aberration and comatic aberration at the telephoto end cannot be corrected easily.

Provided that a point at which the main beam which intersects the optical axis at the eyepoint intersects the optical axis within or near the zoom objective lens is the position of the diaphragm of the objective lens, it is preferable in terms of correction of the distortion or comatic aberration that the structure be so formed in such a manner that the center of the curvature of the positive meniscus lens facing an object or the image is the same as the imaginary diaphragm position at the position adjacent to the wide angle end, the positive meniscus lens of the second lens group having a convex facing the image.

Figure 3:
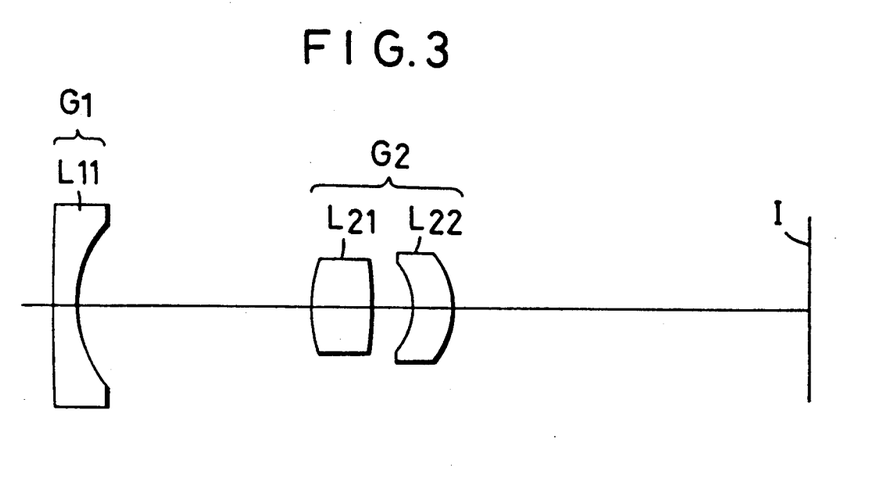

FIG. 3 is a cross-sectional view which specifically illustrates the structure of a second embodiment of the zoom objective lens according to the present invention. The difference from the first embodiment lies only in the structure of the first lens group $G_1$. The first lens group $G_1$ comprises a negative meniscus lens $L_{11}$ having a strongly curved concave surface facing the image. Also according to the second embodiment, the structure is, of course, so formed that the above-described conditions (1) and (2) are satisfied.

The zoom objective lens of the Keplerian zoom finder optical system according to the present invention may comprises three lens groups, that is, a negative lens group and two positive lens groups. However, in this case, it is preferable that a third lens group $G_3$ having a positive refracting power be disposed adjacent to a composed focal point of the first lens group $G_1$ and the second lens group $G_2$. In particular, it is preferable that the third lens group $G_3$ be so disposed that the front principal point thereof is positioned more adjacent to an object than the above-described composed focal point. The third lens group $G_3$ has a function as a so-called visual lens and is effective when no visual lens is provided in the ocular.

Figure 4:
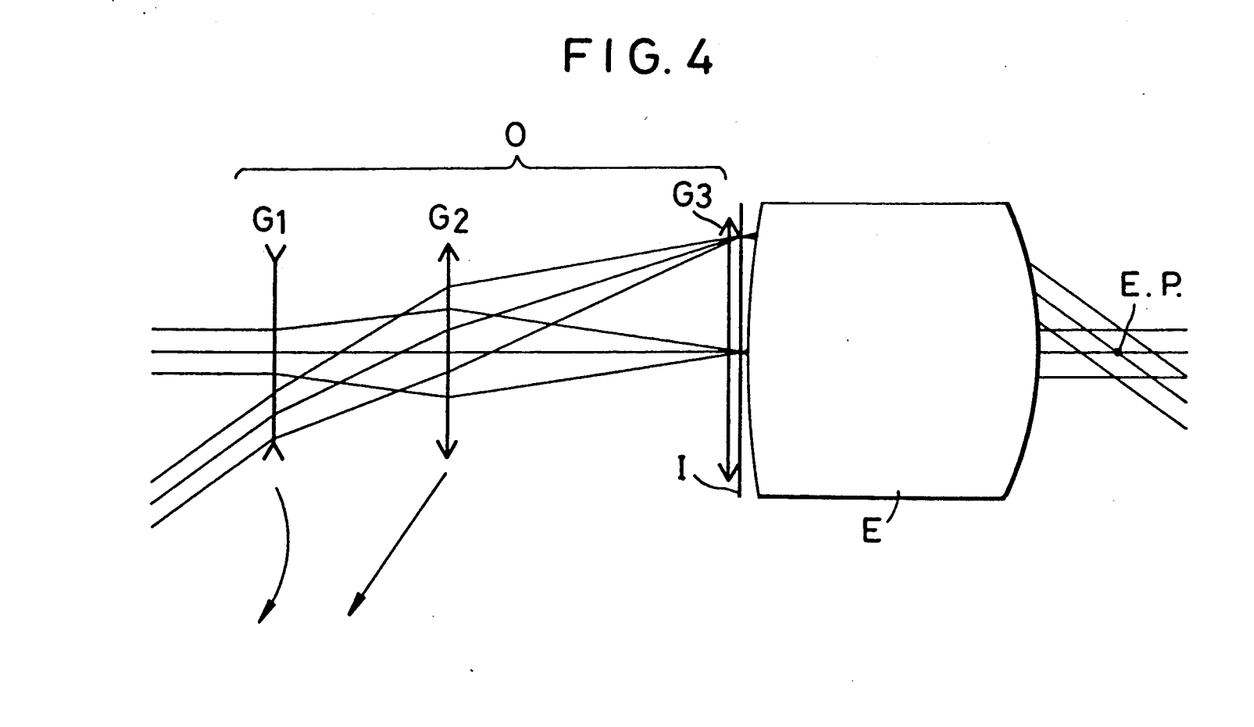
FIG. 4 is a view which illustrates the schematic structure of another Keplerian zoom finder optical system according to the present invention, the Keplerian zoom finder optical system having a zoom objective lens formed by three lens groups, that is, a negative lens group and two positive lens groups.

According to a third to fifth embodiments of the present invention, a structure is formed such that the zoom objective lens is formed by three lens groups, that is a negative lens group and two positive lens groups. FIG. 4 is a view which illustrates the structure of the third to fifth embodiments. Referring to FIG. 4, symbol $G_3$ represents the third lens group and the other symbols are the same as those shown in FIG. 1.

As shown in FIG. 4, the third lens group $G_3$ is disposed adjacent to the position of the intermediate image, the third lens group $G_3$ serving as a visual lens. According to these embodiments, zooming from the wide angle end to the telephoto end is conducted, similarly to the zoom objective lens formed by two lens groups shown in FIG. 1, such that the second lens group $G_2$ is moved toward an object with the first lens group $G_1$ moved so as to form a convex path toward the image.

Figure 5:
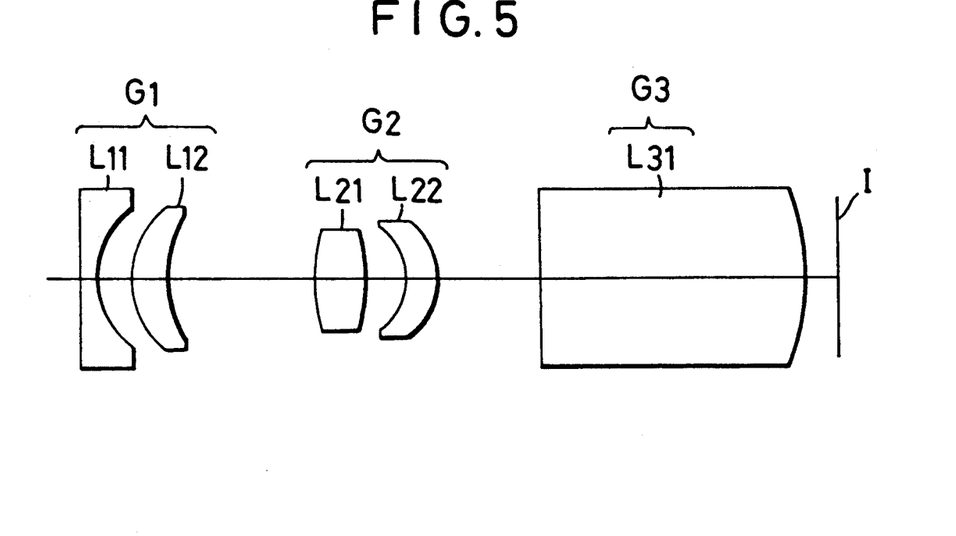
FIGS. 5, 6, and 7 are cross-sectional views which respectively illustrates a third, fourth, and fifth embodiments of the zoom objective lens according to the present invention, the zoom objective lens being formed by three lens groups, that is, a negative lens group and two positive lens groups.
Figure 6:
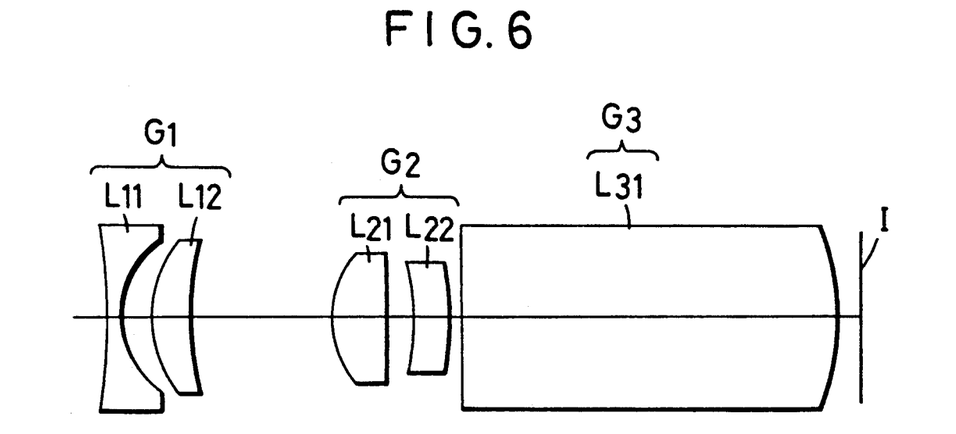
Figure 7:
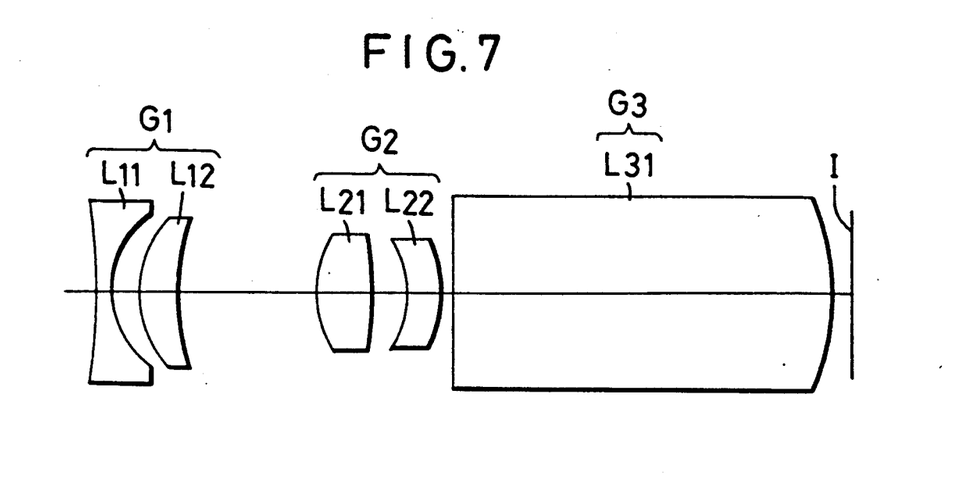

The schematic structure of the zoom objective lens according to the third to fifth embodiments is formed such that the structure of the lenses are arranged similarly to that according to the third embodiment shown in FIG. 5. FIGS. 6 and 7 are views which illustrate the structure of the lens according to the fourth and fifth embodiments, respectively.

The structure of each of the zoom objective lenses is so arranged as to comprise the first lens group $G_1$ consisting of the negative lens $L_{11}$ having a strongly curved concave surface facing the image and the positive meniscus lens $L_{12}$ having the convex surface facing an object, the second lens group $G_2$ consisting of the both side convex lens $L_{21}$ and the positive meniscus lens $L_{22}$ having the convex surface facing the image, and the third lens group $G_3$ consisting of the thick positive lens $L_{31}$.

In the case where the zoom objective lens is formed by three lens groups as described above, it is preferable that the following conditions be met:

$$0 < \frac{l}{f_2} < 0.3 \quad (6)$$

$$1.5 < \frac{f_3}{f_2} < 3 \quad (7)$$

where
  l: the distance from the apex of the final surface of the third lens group $G_3$ to the focal point of the objective lens
  $f_2$: the focal length of the second lens group $G_2$
  $f_3$: the focal length of the third lens group $G_3$ The condition (6) defines the most suitable position of the third lens group $G_3$. If the ratio is lowered below the lower limit, the focal point of the zoom objective lens is caused to be positioned in the third lens group $G_3$, causing a problem of difficulty in positioning the field diaphragm which act to section the field of view of the finder. If the ratio exceeds the upper limit, the height of the flux out of the optical axis which passes through the third lens group $G_3$ from the optical axis is reduced, causing the effect as the field lens to be deteriorated.

The condition (7) defines a proper focal length of the third lens group $G_3$. If the ratio is out of either the upper limit or the lower limit, the function as the field lens is deteriorated, causing the position of the eyepoint become unsuitable. This gives rise to a problem of generation of excessive aberration out of the optical axis.

Now the structure of the first lens group $G_1$ in the zoom objective lens according to the first to the fifth embodiments will be described.

In the case where the first lens group $G_1$ is formed by two lenses, it is preferable that the first lens group $G_1$ comprises the negative lens $L_{11}$ having the strongly curved concave surface facing the image and the positive meniscus lens $L_{12}$ having a strongly curved convex surface facing an object. Furthermore, it is preferable that the structure be so arranged that the following condition is met:

$$0.6 < \frac{r_e}{r_f} < 0.9 \quad (8)$$

where
  $r_e$: the radius of curvature of the concave surface of the negative lens in the first lens group
  $r_f$: the radius of curvature of the surface of the positive meniscus lens in the first lens group, the surface facing an object If a ratio exceeds the upper limit defined in the condition (8), excessive higher-spherical aberration generates on the surface of the positive meniscus lens facing an object. As a result, negative spherical aberration becomes excessive at the telephoto end. If a ratio is lowered below the lower limit, it is difficult to correct astigmatism at the wide angle end.

In this case, it is preferable in terms of improving the correction of the negative distortion at the wide angle end that the surface of the negative lens $L_{11}$ in the first lens group $G_1$ facing the image be formed by an aspheric surface whose curvature is weakened toward the periphery.

On the other hand, in the case where the zoom ratio or the aperture ratio of the zoom objective lens is reduced, the first lens group $G_1$ may be formed by only the negative meniscus lens $L_{11}$ as shown in FIG. 3. In order to conduct the correction of aberration satisfactorily, it is preferable that the following condition be met:

$$0 < \frac{r_e}{r_d} < 0.2 \quad (9)$$

where
  $r_d$: the radius of curvature of the surface of the negative meniscus lens in the first lens group, the surface facing an object $r_e$: the radius of curvature of the surface of the negative meniscus lens in the first lens group, the surface facing the image If a ratio exceeds the upper limit defined in the condition (9), the comatic aberration cannot be corrected easily. If a ratio is lowered below the lower limit, the distortion cannot be corrected easily. In this case, it is preferable that the surface of the negative lens $L_{11}$ in the first lens group $G_1$ facing the image be formed by an aspheric surface whose curvature is weakened toward the periphery.

When the first lens group $G_1$ is formed by a positive lens and a negative lens or by a negative lens, it is preferable that the aspheric surface to be formed on the surface of the negative lens in the first lens group $G_1$ facing the image be so formed that the following condition is met:

$$0.15 < \frac{x_e(y)}{r_e} < 0.197 \text{ (where } y = 0.6 \ r_e) \quad (10)$$

where
- re: the paraxial curvature radius of the negative lens in the first lens group
- $x_e(y)$: the distance in the direction of the optical axis at the aspheric surface of the negative lens in the first lens group facing the image, the distance being from the contact plane of the apex of the aspheric surface to the aspheric surface at height h from the optical axis perpendicular to the same
- $R_e$: reference curvature radius of the surface of the negative lens in the first lens group, the surface facing the image $$r_e = \frac{1}{(1/Re) + 2 \cdot}$$

If the ratio exceeds the upper limit of this condition, the effect of the aspheric surface deteriorates, causing difficulty of correction of negative distortion at the wide angle end. If the ratio is lowered below the lower limit, the effect of the aspheric surface becomes excessive, causing difficulty in correction of variable aberrations.

The second lens group $G_2$ according to each of the embodiments comprises the two side convex lens $L_{21}$ and the positive meniscus lens $L_{22}$ whose convex surface faces the image. In particular, the positive meniscus lens $L_{22}$ has the surface facing an object and the other surface facing the image which have substantially the same curvature. Therefore, the second lens group $G_2$ has an extremely reduced positive refracting power.

Tables 1 to 5 show the specifications of the first to the fifth embodiments of the zoom objective lens according to the present invention. In the tables, the numbers disposed at the left end represent the sequential order of lens surfaces counted from an object, symbol r represents the curvature radius of a surface of a lens surface, d represents the distance between the surfaces of lenses, v represents the Abbe number, n represents the refracting power with respect to line d ($\lambda = 587.6$ nm), f represents the focal length, FN represents the F-number, and $2\omega$ represents the angle of field. Symbol * disposed to the right of a lens surface number represents an aspheric surface, the aspheric surface being expressed by the above-described aspheric surface equation. In the following embodiments the conical constant and aspheric surface coefficients are expressed in terms of E, representing the base 10, followed by a number designating a power to which the base 10 is raised.

TABLE 1

(first embodiment)
$f = 12$ to $28$, $FN = 6.0$, $2\omega = 53.4$ to $23.4°$

| | r | d | v | n |
|---|---|---|---|---|
| 1 | 40.348 | 1.30 | 57.6 | 1.49108 |
| 2* | 4.718 ($r_e$) | 2.70 | | |
| 3 | 6.928 ($r_f$) | 2.20 | 57.6 | 1.49108 |
| 4 | 11.230 | (variable) | | |
| 5 | 15.194 ($r_b$) | 3.50 | 57.6 | 1.49108 |
| 6 | −21.164 ($r_c$) | 2.50 | | |
| 7 | −5.077 ($r_a$) | 2.00 | 57.6 | 1.49108 |
| 8* | −5.026 ($r_g$) | (variable) | | | f 12.0000 to 28.0000
d4 16.8145 to 2.4144
d8 26.2605 to 42.2604

The second surface
Reference curvature radius: $R_e = 4.718$
Conical constant: k = 0.5000E + 00
Aspheric surface coefficient
A2 = 0.0000
A4 = 0.7952E−04, A6 = 0.7787E−05
A8 = −0.3410E−06, A10 = 0.7291E−08

The eighth surface
Reference curvature radius: $R_g = -5.026$
Conical constant: k = 0.5700E + 00
Aspheric surface coefficient
A2 = 0.0000
A4 = −0.6904E−04, A6 = 0.4542E−05
A8 = −0.4642E−06, A10 = 0.3693E−08

TABLE 2

(second embodiment)
$f = 10$ to $18$, $FN = 6.3$, $2_{107} = 55$ to $31.4°$

| | r | d | v | n |
|---|---|---|---|---|
| 1 | 116.480 ($r_d$) | 1.30 | 57.6 | 1.49108 |
| 2* | 6.213 ($r_e$) | (variable) | | |
| 3 | 8.162 ($r_b$) | 3.00 | 57.6 | 1.49108 |
| 4 | −24.126 ($r_c$) | 2.00 | | |
| 5 | −4.062 ($r_a$) | 2.00 | 57.6 | 1.49108 |
| 6* | −3.977 ($r_g$) | (variable) | | | f 10.0000 to 18.0000
d2 11.8219 to 4.5059
d6 18.1750 to 27.9076

The second surface
Reference curvature radius: $R_c = 6.213$
Conical constant: k = 0.7000E + 00
Aspheric surface coefficient
A2 = 0.0000
A4 = −0.1195E−03, A6 = 0.4145E−05
A8 = −0.2224E−06, A10 = −0.2478E−08

The sixth surface
Reference curvature radius: $R_g = -3.977$
Conical constant: k = 0.1000E + 01
Aspheric surface coefficient
A2 = 0.0000
A4 = 0.7988E−03, A6 = 0.1329E−03
A8 = −0.1317E−04, A10 = 0.9130E−06

TABLE 3

(third embodiment)
$f = 11$ to $20$, $FN = 4.0$, $2\omega = 56.2$ to $30.6°$

| | r | d | v | n |
|---|---|---|---|---|
| 1 | 190.445 | 1.30 | 57.6 | 1.49108 |
| 2* | 5.199 ($r_e$) | 2.50 | | |
| 3 | 6.580 ($r_f$) | 2.20 | 57.6 | 1.49108 |
| 4 | 9.594 | (variable) | | |
| 5 | 13.608 ($r_b$) | 3.50 | 57.6 | 1.49108 |
| 6 | −13.439 ($r_c$) | 2.40 | | |
| 7 | −4.600 ($r_a$) | 2.00 | 57.6 | 1.49108 |
| 8* | −4.634 ($r_g$) | (variable) | | |
| 9 | ∞ | 18.00 | 57.6 | 1.49108 |
| 10 | −15.223 | (variable) | | | f 11.0000 to 20.0000

TABLE 3-continued (third embodiment)
f = 11 to 20, FN = 4.0, 2ω = 56.2 to 30.6°

| r | d | ν | n |
|---|---|---|---| d4 9.9000 to 1.2594
d8 7.1166 to 15.7087
d10 2.0000 to 2.0000
The second surface
Reference curvature radius: $R_e = 5.199$
Conical constant: k = 0.7000E + 00
Aspheric surface coefficient
A2 = 0.0000
A4 = 0.1391E-03, A6 = 0.1740E-05
A8 = −0.2301E-06, A10 = 0.7127E-08
The eighth surface
Reference curvature radius: $R_g = -4.634$
Conical constant: k = 0.5500E + 00
Aspheric surface coefficient
A2 = 0.0000
A4 = −0.7585E-04, A6 = 0.1068E-04
A8 = −0.2250E-05, A10 = 0.1440E-06
A12 = −0.3800E-08

TABLE 4

(fourth embodiment)
f = 9 to 16.2, FN = 4.0, 2ω = 56.2 to 31.3°

|   | r | d | ν | n |
|---|---|---|---|---|
| 1 | −37.237 | 1.00 | 57.6 | 1.49108 |
| 2* | 3.912 ($r_e$) | 1.30 | | |
| 3 | 5.985 ($r_f$) | 1.80 | 57.6 | 1.49108 |
| 4 | 16.103 | (variable) | | |
| 5 | 5.165 ($r_b$) | 2.60 | 57.6 | 1.49108 |
| 6 | −72.796 ($r_c$) | 1.20 | | |
| 7 | −12.279 ($r_a$) | 1.80 | 57.6 | 1.49108 |
| 8* | −11.056 ($r_g$) | (variable) | | |
| 9 | ∞ | 18.70 ∞57.6 | 1.49108 | |
| 10 | −10.500 | (variable) | | | f 9.0000 to 16.2000
d4 7.0753 to 1.1046
d8 0.4408 to 6.3958
d10 0.7000 to 0.7000
The second surface
Reference curvature radius: $R_e = 3.912$
Conical constant: k = 0.7000E + 00
Aspheric surface coefficient
A2 = 0.0000
A4 = −0.3526E-03, A6 = 0.1783E-04
A8 = −0.7944E-05, A10 = 0.2283E-06
The eighth surface
Reference curvature radius: $R_g = -11.056$
Conical constant: k = 0.5500E + 00
Aspheric surface coefficient
A2 = 0.0000
A4 = 0.1770E-02, A6 = 0.6161E-04
A8 = −0.7563E-06, A10 = 0.6326E-06

TABLE 5

(fifth embodiment)
f = 9 to 16.2, FN = 4.0, 2ω = 56.1 to 30.9°

|   | r | d | ν | n |
|---|---|---|---|---|
| 1 | −40.418 | 1.00 | 57.6 | 1.49108 |
| 2* | 4.089 ($r_e$) | 1.30 | | |
| 3 | 5.657 ($r_f$) | 1.80 | 57.6 | 1.49108 |
| 4 | 12.286 | (variable) | | |
| 5 | 6.000 ($r_b$) | 2.60 | 57.6 | 1.49108 |
| 6 | −20.380 ($r_c$) | 1.60 | | |
| 7 | −6.474 ($r_a$) | 1.80 | 57.6 | 1.49108 |
| 8* | −6.332 ($r_g$) | (variable) | | |
| 9 | ∞ | 18.40 | 57.6 | 1.49108 |
| 10 | −12.277 | (variable) | | | f 9.0000 to 16.2000
d4 6.7014 to 0.6684
d8 0.5268 to 6.5387
d10 1.0000 to 1.0000
The second surface
Reference curvature radius: $R_e = 4.089$ TABLE 5-continued (fifth embodiment)
f = 9 to 16.2, FN = 4.0, 2ω = 56.1 to 30.9°

| r | d | ν | n |
|---|---|---|---|

Conical constant: k = 0.7000E + 00
Aspheric surface coefficient
A2 = 0.0000
A4 = −0.1893E-03, A6 = 0.3937E-04
A8 = −0.7224E-05, A10 = 0.2212E-06
The eighth surface
Reference curvature radius: $R_g = 6.332$
Conical constant: k = 0.5500E + 00
Aspheric surface coefficient
A2 = 0.0000
A4 = 0.9159E-03, A6 = 0.5946E-04
A8 = −0.2361E-05, A10 = 0.3005E-06

TABLE 6

(Numerical table corresponding to conditions)

| Embodiments | $\dfrac{f_1}{f_2}$ | $\dfrac{r_a}{f_2}$ | $\dfrac{f_2}{f_a}$ | $\dfrac{r_b}{r_c}$ |
|---|---|---|---|---|
| 1 | −1.000 | −0.292 | 0.238 | −0.718 |
| 2 | −1.093 | −0.331 | 0.239 | −0.338 |
| 3 | −1.120 | −0.324 | 0.179 | −1.012 |
| 4 | −1.250 | −1.128 | 0.063 | −0.071 |
| 5 | −1.248 | −0.641 | 0.081 | −0.294 |

| Embodiments | P | $\dfrac{1}{f_2}$ | $\dfrac{f_3}{f_2}$ | $\dfrac{r_c}{r_f}$ |
|---|---|---|---|---|
| 1 | 0.03156 | | | 0.681 |
| 2 | 0.03153 | | | |
| 3 | 0.03155 | 0.141 | 2.183 | 0.791 |
| 4 | 0.01844 | 0.070 | 2.138 | 0.654 |
| 5 | 0.03048 | 0.099 | 2.475 | 0.723 |

| Embodiments | $\dfrac{r_c}{r_d}$ | Q |
|---|---|---|
| 1 | | 0.1906 |
| 2 | 0.053 | 0.1896 |
| 3 | | 0.1956 |
| 4 | | 0.1895 |
| 5 | | 0.1916 | where
$P = \dfrac{x_g(y)}{r_g}$ (where $y = 0.25\ r_g$)

$Q = \dfrac{x_e(y)}{r_e}$ (where $y = 0.6\ r_e$)

In each of the above-described zoom objective lenses, since aberration is extremely satisfactorily corrected from the wide angle end to the telephoto end, a clear intermediate image can be formed solely by a zoom objective lens having a reduced number of lenses.

As described above, since aberration can be extremely satisfactorily corrected solely by the zoom objective lens, the ocular to be applied to the Keplerian zoom finder optical system according to the present invention is not limited in terms of the types thereof. In the embodiment of FIG. 4 it is preferable that ocular E does not include a field lens since the zoom objective lens is formed by three lens groups including a field lens. However, since the zoom objective lens, shown in FIG. 1 is formed by two lens groups including no field lens, it is preferable that the ocular E includes a field lens.

Figure 8:
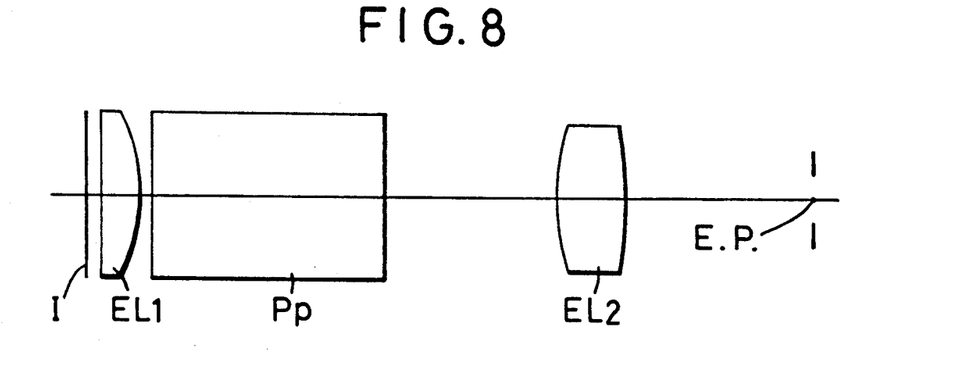
FIG. 8 is a cross-sectional view which illustrates the structure of an ocular lens to be combined with the zoom objective lens according to the first and second embodiments.
Figure 9:
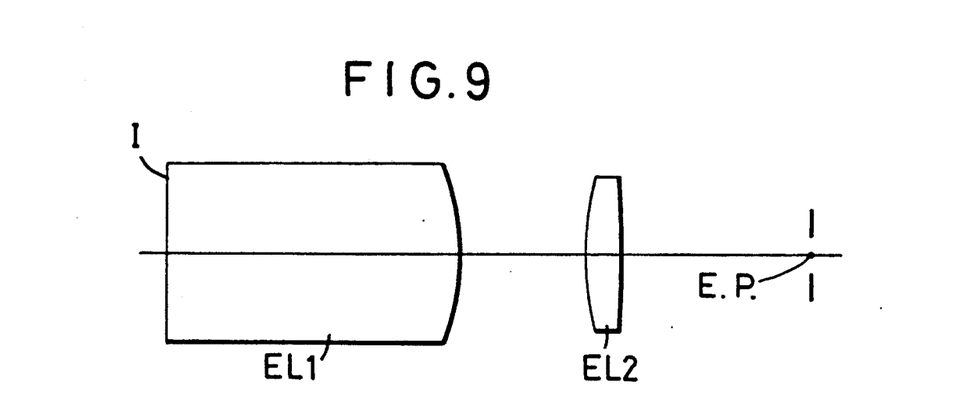
FIG. 9 is a cross-sectional view which illustrates the structure of an ocular lens to be combined with the zoom objective lens according to the third to fifth embodiments.

Tables 7 and 8 show a specific example in which a field lens is included in the ocular and another example in which no field lens is includes in the same. FIGS. 8 and 9 show the structures of the lens arrangement of the ocular corresponding to Tables 7 and 8. The parameters of the ocular shown in Table 7 are those when combined with the zoom objective lens structured by two lens groups according to the first embodiment. The specific structure of the ocular is so arranged as to comprise a positive lens $EL_1$ disposed at the most adjacent position to an object and serving as a field lens, the positive lens $EL_1$ being so disposed as to have the surface with the most strong curvature facing the image, a thick parallel plate $P_p$, and a positive lens $EL_2$ whose surface with a strong curvature faces an object and having an aspheric surface for this surface. The parameters of the ocular shown in Table 8 are those when combined with the objective lens structured by three lens groups according to the third embodiment. The specific structure of the ocular is so arranged as to comprise a thick positive lens $EL_1$ whose surface with the most strong curvature faces the image, and a positive lens $EL_2$ whose surface with a strong curvature faces an object.

In the tables, the intervals between surfaces shown at the uppermost position represent the distance from the focal plane of the zoom lens to the first surface of the ocular, while the intervals between the surfaces shown at the lowermost position represent the distance from the final plane of the ocular to the eyepoint (E.P), where the focal length of the ocular is $f_e$. Furthermore, the shown magnifications and the dipoters are those when combined with the zoom objective lens.

TABLE 7

(Example 1 of the ocular)
$f_e = 35.08$, magnification 0.41X to 0.96X
Diopter: −1.02

|   | r | d | ν | n |
|---|---|---|---|---|
|   |   | 1.00 |   |   |
| 1 | ∞ | 3.50 | 57.6 | 1.49108 |
| 2 | −14.000 | 0.50 |   |   |
| 3 | ∞ | 19.00 | 57.6 | 1.49108 |
| 4 | ∞ | 14.00 |   |   |
| 5* | 24.000 | 5.50 | 57.6 | 1.49108 |
| 6 | −48.000 | 15.00 |   |   |
|   |   | (E.P.) |   |   |

The fifth surface

Reference curvature radius: R = 24.000
conical constant: k = −0.4700E + 00
the n-th aspheric coefficient: An = 0

TABLE 8

(Example 2 of the ocular)
$f_e = 22.78$, magnification 0.48X to 0.88X
Diopter: −1.06

|   | r | d | ν | n |
|---|---|---|---|---|
|   |   | 0.00 |   |   |
| 1 | ∞ | 24.00 | 57.6 | 1.49108 |
| 2 | −20.000 | 10.00 |   |   |
| 3 | 23.000 | 3.00 | 57.6 | 1.49108 |
| 4 | −102.000 | 15.00 |   |   |
|   |   | (E.P.) |   |   |

The above-described ocular has been extremely satisfactorily aberration-corrected from the wide angle end to the telephoto end as a completed zoom finder system in which the number of the lenses is reduced. The ocular of the Keplerian zoom finder optical system according to the present invention is not, of course, limited to the structures shown in FIGS. 8 and 9. The zoom objective lens according to the present invention may be combined with another type of ocular in which the aberration is reduced.

Since the images which can be observed by a Keplerian zoom finder optical system of the type according to the present invention are inverted images, an optical system capable of erecting an image is necessary. For example, the use of an invention disclosed by the applicant of the present invention in Japanese Patent Application No. 63-60919 will realize a compact finder system exhibiting wide field.

Specifically, an image can be erected in the case where the ocular according to Example 1 is combined with the zoom objective lens according to the first embodiment, the image being able to be erected by way of providing two reflection surfaces intersecting perpendicularly to each other between the final plane of the zoom objective lens and the intermediate image surface and by way of further providing two reflection surfaces intersecting perpendicularly to each other within the thick parallel plane $P_p$ in the ocular according to Example 1.

Furthermore, an image can be erected in another way in the case where the ocular according to Example 2 is combined with the zoom objective lens according to the third embodiment, the erection being realized by providing two reflection surfaces intersecting perpendicularly to each other within the thick positive lens $L_{31}$ forming the third lens group $G_3$ and further providing two reflection surfaces intersecting perpendicularly to each other within the thick positive lens of the ocular.

Furthermore, the image erection may be realized by using a relay optical system or the like.

What is claimed is:

1. A Keplerian zoom finder optical system having a zoom power variable objective lens, said Keplerian zoom finder optical system comprising:

a zoom objective lens including a first lens group having a negative refracting power and capable of being moved for the purpose of conducting the zoom power variation and a second lens group including at least a positive meniscus lens whose convex surface faces an image and having a positive refracting power, said second lens group being relatively moved with respect to said first lens group for the purpose of conducting the zoom power variation; and an ocular used for enlarging and observing the image formed by said zoom objective lens, wherein provided that the focal length of said first lens group is $f_1$, the focal length of said second lens group is $f_2$, and the curvature radius of said convex surface is $r_a$, the structure thereof is so formed as to meet the following conditions:

$$0.8 < \frac{|f_1|}{f_2} < 1.4 \ (f_1 < 0)$$

$$0.1 < \frac{|r_a|}{f_2} < 1.4 \ (r_a < 0)$$

2. A zoom finder optical system according to claim 1, wherein said second lens group further includes a two side convex lens at the position more adjacent to an object than said positive meniscus lens and is structured so as to meet the following conditions, wherein $r_b$ is the radius of curvature of the surface of the two side convex lens of the second lens group facing the object, and $r_c$ is the radius of curvature of the surface of the two side convex lens of the second lens group facing the image:

$$0 < \frac{|f_2|}{f_a} < 0.4$$

$$0 < \frac{r_b}{|r_c|} < 1.2 \; (r_c < 0)$$

3. A zoom finder optical system according to claim 1, wherein said second lens group further includes a two side convex lens at a position more adjacent to the object than said positive meniscus lens and a surface of said positive meniscus lens facing the image is formed as an aspheric surface whose curvature is weakened in proportion to a distance from an optical axis.

4. A zoom finder optical system according to claim 1, wherein said zoom objective lens further includes a third lens group having a positive refracting power adjacent to a composed focal point of said first lens group and said second lens group, said zoom objective lens being so structured as to meet following conditions provided that the focal length of said second lens group is $f_2$, the focal length of said third lens group is $f_3$, and the distance from an apex of a final plane of said third lens group to a focal point of said zoom objective lens is l:

$$0 < \frac{l}{f_2} < 0.3,$$

$$1.5 < \frac{|f_3|}{f_2} < 2$$

5. A zoom finder optical system according to claim 1, wherein said first lens group comprises a negative lens whose strong concave surface faces the image and a positive meniscus lens whose convex surface faces the object in this sequential order counted from the object, said first lens group being so structured as to meet the following conditions provided that the curvature radius of a surface of said negative lens facing the image is $r_e$ and the curvature radius of a surface of said positive meniscus lens facing the object is $r_f$:

$$0.6 < \frac{r_e}{r_f} < 0.9$$

6. A zoom finder optical system according to claim 5, wherein said surface of said negative lens in said first lens group facing the image is formed as an aspheric surface whose curvature is weakened toward a periphery thereof.

7. A zoom finder optical system according to claim 1, wherein said first lens group comprises a negative meniscus lens whose convex surface faces the object, said first lens group being so formed as to meet the following conditions provided that the curvature radius of surfaces of said negative meniscus lens facing the object and image are $r_d$ and $r_e$ respectively:

$$0 < \frac{r_e}{r_d} < 0.2$$

8. A zoom finder optical system according to claim 7, wherein said surface of said negative meniscus lens facing the image is formed as an aspheric surface whose curvature is weakened toward a periphery thereof.

9. A zoom finder optical system according to claim 1, wherein said zoom objective lens is composed in accordance with data shown in the following:

TABLE

| | f = 12 to 28, FN = 6.0, 2ω = 53.4 to 23.4° | | | |
|---|---|---|---|---|
| | r | d | v | n |
| 1 | 40.348 | 1.30 | 57.6 | 1.49108 |
| 2* | 4.718 ($r_e$) | 2.70 | | |
| 3 | 6.928 ($r_f$) | 2.20 | 57.6 | 1.49108 |
| 4 | 11.230 | (variable) | | |
| 5 | 15.194 ($r_b$) | 3.50 | 57.6 | 1.49108 |
| 6 | −21.164 ($r_c$) | 2.50 | | |
| 7 | −5.077 ($r_a$) | 2.00 | 57.6 | 1.49108 |
| 8* | −5.026 ($r_g$) | (variable) | | |
| f | 12.0000 to 28.0000 | | | |
| d4 | 16.8145 to 2.4144 | | | |
| d8 | 26.2605 to 42.2604 | | | | wherein for the second surface:
Reference curvature radius: $R_e = 4.718$
Conical constant: $k = 0.5000E + 00$
Aspheric surface coefficients:
A2 = 0.0000
A4 = 0.7952E-04,  A6 = 0.7787E-05
A8 = −0.3410E-06,  A10 = 0.7291E-08
wherein for the eighth surface:
Reference curvature radius: $R_g = -5.026$
Conical constant: $k = 0.5700E + 00$
Aspheric surface coefficients:
A2 = 0.0000
A4 = 0.6904E-04,  A6 = 0.4542E-05
A8 = −0.4642E-06,  A10 = 0.3693E-08 wherein, the numbers disposed in the left column of the table represent lens surfaces in sequential order counted from an object, symbol r represents the curvature radius of a surface of a lens, d represents the distance between surfaces of lenses, υ represents the Abbe number, n represents the refracting power with respect to line d (λ=587.6 nm), f represents the focal length, FN represents the F-number, 2ω represents the angle of field, symbol * disposed to the right of a lens surface number represents an aspheric surface, the aspheric surface being expressed by the aspheric surface equation:

$$x(y) = \frac{y^2/R}{1 + \sqrt{(1 - k \cdot y^2/R^2)}} + A2 \cdot y^2 + A3 \cdot |y|^3 + A4 \cdot y^4 + A5 \cdot |y|^5 + A6 \cdot y^6 + A7 \cdot |y|^7 + A8 \cdot y^8 + A9 \cdot |y|^9 + A10 \cdot y^{10} + , \ldots$$

where y represents the vertical height from the optical axis, the distance at y from the apex of the aspheric surface to the contact plane along the optical axis is x(y), and R represents the reference curvature radius, and wherein the conical constant and the aspheric surface coefficients are expressed in terms of E, representing the base 10, followed by a number designating a power to which the base 10 is raised.

10. A zoom finder optical system according to claim 1, wherein said zoom objective lens is composed in accordance with data shown in the following:

TABLE

| | f = 10 to 18, FN = 6.3, 2ω = 55 to 31.4° | | | |
|---|---|---|---|---|
| | r | d | v | n |
| 1 | 116.480 ($r_d$) | 1.30 | 57.6 | 1.49108 |
| 2* | 6.213 ($r_e$) | (variable) | | |
| 3 | 8.162 ($r_b$) | 3.00 | 57.6 | 1.49108 |
| 4 | −24.126 ($r_c$) | 2.00 | | |

TABLE-continued $f = 10$ to $18$, $FN = 6.3$, $2\omega = 55$ to $31.4°$

| | | | | |
|---|---|---|---|---|
| 5 | −4.062 ($r_a$) | 2.00 | 57.6 | 1.49108 |
| 6* | −3.977 ($r_g$) | (variable) | | |

| | |
|---|---|
| f | 10.0000 to 18.0000 |
| d2 | 11.8219 to 4.5059 |
| d6 | 18.1750 to 27.9076 | wherein for the second surface:
Reference curvature radius: $R_e = 6.213$
Conical constant: $k = 0.7000E + 00$
Aspheric surface coefficients:
A2 = 0.0000
A4 = 0.1195E-03,   A6 = 0.4145E-05
A8 = −0.2224E-06,   A10 = −0.2478E-08 wherein for the sixth surface:
Reference curvature radius: $R_g = -3.977$
Conical constant: $k = 0.1000E + 01$
Aspheric surface coefficients:
A2 = 0.0000
A4 = 0.7988E-03,   A6 = 0.1329E-03
A8 = −0.1317E-04,   A10 = 0.9130E-06 wherein, the numbers disposed in the left column of the table represent lens surfaces in sequential order counted from an object, symbol r represents the curvature radius of a surface of a lens, d represents the distance between surfaces of lenses, $\upsilon$ represents the Abbe number, n represents the refracting power with respect to line d ($\lambda = 587.6$ nm), f represents the focal length, FN represents the F-number, $2\omega$ represents the angle of field, symbol * disposed to the right of a lens surface number represents an aspheric surface, the aspheric surface being expressed by the aspheric surface equation:

$$x(y) = \frac{y^2/R}{1 + \sqrt{(1 - k \cdot y^2/R^2)}} + A2 \cdot y^2 + A3 \cdot |y|^3 + A4 \cdot y^4 + A5 \cdot |y|^5 + A6 \cdot y^6 + A7 \cdot |y|^7 + A8 \cdot y^8 + A9 \cdot |y|^9 + A10 \cdot y^{10} + , \ldots$$

where y represents the vertical height from the optical axis, the distance at y from the apex of the aspheric surface to the contact plane along the optical axis is x (y), and R represents the reference curvature radius, and wherein the conical constant and the aspheric surface coefficients are expressed in terms of E, representing the base 10, followed by a number designating a power to which the base 10 is raised.

11. A zoom finder optical system according to claim 1, wherein said ocular includes a positive field lens whose surface with a strong curvature faces the image, a thick parallel plate, and a positive lens whose surface with a strong curvature faces the object and is an aspheric surface, said ocular being composed in accordance with data shown in the following:

TABLE $f = 35.08$, magnification $0.41X$ to $0.96X$
Diopter: −1.02

| | r | d | $\upsilon$ | n |
|---|---|---|---|---|
| | | 1.00 | | |
| 1 | ∞ | 3.50 | 57.6 | 1.49108 |
| 2 | −14.000 | 0.50 | | |
| 3 | ∞ | 19.00 | 57.6 | 1.49108 |
| 4 | ∞ | 14.00 | | |
| 5* | 24.000 | 5.50 | 57.6 | 1.49108 |
| 6 | −48.000 | 15.00 | | |
| | | (E.P.) | | | wherein for the fifth surface:

TABLE-continued $f = 35.08$, magnification $0.41X$ to $0.96X$
Diopter: −1.02

Reference curvature radius: $R = 24.000$
Conical constant: $k = -0.4700E + 00$
the n-th aspheric coefficient: An = 0 wherein, the numbers disposed in the left column of the table represent lens surfaces in sequential order counted from an object, symbol r represents the curvature radius of a surface of a lens, d represents the distance between surfaces of lenses, $\upsilon$ represents the Abbe number, n represents the refracting power with respect to line d ($\lambda = 587.6$ nm), f represents the focal length, FN represents the F-number, $2\omega$ represents the angle of field, symbol * disposed to the right of a lens surface number represents an aspheric surface, the aspheric surface being expressed by the aspheric surface equation:

$$x(y) = \frac{y^2/R}{1 + \sqrt{(1 - k \cdot y^2/R^2)}} + A2 \cdot y^2 + A3 \cdot |y|^3 + A4 \cdot y^4 + A5 \cdot |y|^5 + A6 \cdot y^6 + A7 \cdot |y|^7 + A8 \cdot y^8 + A9 \cdot |y|^9 + A10 \cdot y^{10} + , \ldots$$

where y represents the vertical height from the optical axis, the distance at y from the apex of the aspheric surface to the contact plane along the optical axis is x (y), and R represents the reference curvature radius, and wherein the conical constant is expressed in terms of E, representing the base 10, followed by a number designating a power to which the base 10 is raised; and wherein in the table the uppermost distance d represents the distance from the focal plane of the zoom lens to the first surface of the ocular and the lowermost distance d represents the distance from the final plane of the ocular to the eyepoint (E.P.), $f_e$ represents the focal length of the ocular, and the magnification and the diopter are those when combined with the zoom objective lens.

12. A zoom finder optical system according to claim 4, wherein said zoom objective lens is composed in accordance with data shown in the following:

TABLE $f = 11$ to $20$, $FN = 4.0$, $2\omega = 56.2$ to $30.6°$

| | r | d | $\upsilon$ | n |
|---|---|---|---|---|
| 1 | 190.445 | 1.30 | 57.6 | 1.49108 |
| 2* | 5.199 ($r_e$) | 2.50 | | |
| 3 | 6.580 ($r_f$) | 2.20 | 57.6 | 1.49108 |
| 4 | 9.594 | (variable) | | |
| 5 | 13.608 ($r_b$) | 3.50 | 57.6 | 1.49108 |
| 6 | −13.439 ($r_c$) | 2.40 | | |
| 7 | −4.600 ($r_a$) | 2.00 | 57.6 | 1.49108 |
| 8* | −4.364 ($r_g$) | (variable) | | |
| 9 | ∞ | 18.00 | 57.6 | 1.49108 |
| 10 | −15.223 | (variable) | | |

| | |
|---|---|
| f | 11.0000 to 20.0000 |
| d4 | 9.9000 to 1.2594 |
| d8 | 7.1166 to 15.7087 |
| d10 | 2.0000 to 2.0000 | wherein for the second surface:
Reference curvature radius: $R_e = 5.199$
Conical constant: $k = 0.7000E + 00$
Aspheric surface coefficients:
A2 = 0.0000
A4 = 0.1391E-03,   A6 = 0.1740E-05
A8 = −0.2301E-06,   A10 = −0.7127E-08 wherein for the eighth surface:
Reference curvature radius: $R_g = -4.634$

TABLE-continued f = 11 to 20, FN = 4.0, 2ω = 56.2 to 30.6°

Conical constant: k = 0.5500E + 00
Aspheric surface coefficients:
A2 = 0.0000
A4 = 0.7585E-04,     A6 = 0.1068E-04
A8 = −0.22
wherein for the second surface:
Reference curvature radius: $R_e$ = 6.213
Conical constant: k = 0.7000E + 00
Aspheric surface coefficients:
A2 = 0.0000
A4 = 0.7585E-04,     A6 = 0.1068E-04
A8 = −0.2250E-05,    A10 = 0.1440E-06
A12 = −0.3800E-08 wherein, the numbers disposed in the left column of the table represent lens surfaces in sequential order counted from an object, symbol r represents the curvature radius of a surface of a lens, d represents the distance between surfaces of lenses, υ represents the Abbe number, n represents the refracting power with respect to line d (λ=587.6 nm), f represents the focal length, FN represents the F-number, 2ω represents the angle of field, symbol * disposed to the right of a lens surface number represents an aspheric surface, the aspheric surface being expressed by the aspheric surface equation:

$$x(y) = \frac{y^2/R}{1 + \sqrt{(1 - k \cdot y^2/R^2)}} + A2 \cdot y^2 + A3 \cdot |y|^3 + A4 \cdot y^4 + A5 \cdot |y|^5 + A6 \cdot y^6 + A7 \cdot |y|^7 + A8 \cdot y^8 + A9 \cdot |y|^9 + A10 \cdot y^{10} + , \ldots$$

where y represents the vertical height from the optical axis, the distance at y from the apex of the aspheric surface to the contact plane along the optical axis is x (y), and R represents the reference curvature radius, and wherein the conical constant and the aspheric surface coefficients are expressed in terms of E, representing the base 10, followed by a number designating a power to which the base 10 is raised.

13. A zoom finder optical system according to claim 4, wherein said zoom objective lens is composed in accordance with data shown in the following:

TABLE

F = 9 to 16.2, FN = 4.0, 2ω = 56.2 to 31.3°

| | r | d | υ | n |
|---|---|---|---|---|
| 1 | −37.237 | 1.00 | 57.6 | 1.49108 |
| 2* | 3.912 ($r_e$) | 1.30 | | |
| 3 | 5.985 ($r_f$) | 1.80 | 57.6 | 1.49108 |
| 4 | 16.103 | (variable) | | |
| 5 | 5.165 ($r_b$) | 2.60 | 57.6 | 1.49108 |
| 6 | −72.796 ($r_c$) | 1.20 | | |
| 7 | −12.279 ($r_a$) | 1.80 | 57.6 | 1.49108 |
| 8* | −11.056 ($r_g$) | (variable) | | |
| 9 | ∞ | 18.70 | 57.6 | 1.49108 |
| 10 | −10.500 | (variable) | | |

| f | 9.0000 to 16.2000 |
|---|---|
| d4 | 7.0753 to 1.1046 |
| d8 | 0.4408 to 6.3958 |
| d10 | 0.7000 to 0.7000 | wherein for the second surface:
Reference curvature radius: $R_e$ = 3.912
Conical constant: k = 0.7000E + 00
Aspheric surface coefficients:
A2 = 0.0000
A4 = −0.3526E-03,   A6 = 0.1783E-04
A8 = −0.7944E-05,   A10 = 0.2283E-08

TABLE-continued

F = 9 to 16.2, FN = 4.0, 2ω = 56.2 to 31.3° wherein for the eighth surface:
Reference curvature radius: $R_g$ = −11.056
Conical constant: k = 0.5500E + 00
Aspheric surface coefficients:
A2 = 0.0000
A4 = 0.1770E-02,    A6 = 0.6161E-04
A8 = −0.7563E-06,   A10 = 0.6326E-06 wherein, the numbers disposed in the left column of the table represent lens surfaces in sequential order counted from an object, symbol r represents the curvature radius of a surface of a lens, d represents the distance between surfaces of lenses, υ represents the Abbe number, n represents the refracting power with respect to line d (λ=587.6 nm), f represents the focal length, FN represents the F-number, 2ω represents the angle of field, symbol * disposed to the right of a lens surface number represents an aspheric surface, the aspheric surface being expressed by the aspheric surface equation:

$$x(y) = \frac{y^2/R}{1 + \sqrt{(1 - k \cdot y^2/R^2)}} + A2 \cdot y^2 + A3 \cdot |y|^3 + A4 \cdot y^4 + A5 \cdot |y|^5 + A6 \cdot y^6 + A7 \cdot |y|^7 + A8 \cdot y^8 + A9 \cdot |y|^9 + A10 \cdot y^{10} + , \ldots$$

where y represents the vertical height from the optical axis, the distance at y from the apex of the aspheric surface to the contact plane along the optical axis is x (y), and R represents the reference curvature radius, and wherein the conical constant and the aspheric surface coefficients are expressed in terms of E, representing the base 10, followed by a number designating a power to which the base 10 is raised.

14. A zoom finder optical system according to claim 4, wherein said zoom objective lens is composed in accordance with data shown in the following:

TABLE

F = 9 to 16.2, FN = 4.0, 2ω = 56.1 to 30.9°

| | r | d | υ | n |
|---|---|---|---|---|
| 1 | −40.418 | 1.00 | 57.6 | 1.49108 |
| 2* | 4.089 ($r_e$) | 1.30 | | |
| 3 | 5.657 ($r_f$) | 1.80 | 57.6 | 1.49108 |
| 4 | 12.286 | (variable) | | |
| 5 | 6.000 ($r_b$) | 2.60 | 57.6 | 1.49108 |
| 6 | −20.380 ($r_c$) | 1.60 | | |
| 7 | −6.474 ($r_a$) | 1.80 | 57.6 | 1.49108 |
| 8* | −6.332 ($r_g$) | (variable) | | |
| 9 | ∞ | 18.40 | 57.6 | 1.49108 |
| 10 | −12.277 | (variable) | | |

| f | 9.0000 to 16.200 |
|---|---|
| d4 | 6.7014 to 0.6684 |
| d8 | 0.5268 to 6.5387 |
| d10 | 1.0000 to 1.0000 | wherein for the second surface:
Reference curvature radius: $R_e$ = 4.089
Conical constant: k = 0.7000E + 00
Aspheric surface coefficients:
A2 = 0.0000
A4 = −0.1893E-03,   A6 = 0.3937E-04
A8 = −0.7224E-05,   A10 = 0,2212E-06
wherein for the eighth surface:
Reference curvature radius: $R_g$ = −6.332
Conical constant: k = 0.5500E + 00
Aspheric surface coefficients:
A2 = 0.0000
A4 = 0.09159E-03,   A6 = 0.5946E-04

TABLE-continued

F = 9 to 16.2, FN = 4.0, 2ω = 56.1 to 30.9°

A8 = −0.2361E-05,   A10 = 0.3005E-06 wherein, the numbers disposed in the left column of the table represent lens surfaces in sequential order counted from an object, symbol r represents the curvature radius of a surface of a lens, d represents the distance between surfaces of lenses, υ represents the Abbe number, n represents the refracting power with respect to line d (λ=587.6 nm), f represents the focal length, FN represents the F-number, 2ω represents the angle of field, symbol * disposed to the right of a lens surface number represents an aspheric surface, the aspheric surface being expressed by the aspheric surface equation:

$$x(y) = \frac{y^2/R}{1 + \sqrt{(1 - k \cdot y^2/R^2)}} + A2 \cdot y^2 + A3 \cdot |y|^3 + A4 \cdot y^4 + A5 \cdot |y|^5 + A6 \cdot y^6 + A7 \cdot |y|^7 + A8 \cdot y^8 + A9 \cdot |y|^9 + A10 \cdot y^{10} + ,...$$

where y represents the vertical height from the optical axis, the distance at y from the apex of the aspheric surface to the contact plane along the optical axis is x (y), and R represents the reference curvature radius, and wherein the conical constant and the aspheric surface coefficients are expressed in terms of E, representing the base 10, followed by a number designating a power to which the base 10 is raised.

15. A zoom finder optical system according to claim 4, wherein said ocular includes a positive lens whose surface with a strong curvature faces the image and a positive lens whose surface with a strong curvature faces the object, said ocular being composed in accordance with data shown in the following:

TABLE $f_e$ = 22.78, magnification 0.48X to 0.88X
Diopter: −1.06

| | r | d | v | n |
|---|---|---|---|---|
| | | 0.00 | | |
| 1 | ∞ | 24.00 | 57.6 | 1.49108 |
| 2 | −20.000 | 10.00 | | |
| 3 | 23.000 | 3.00 | 57.6 | 1.49108 |
| 4 | −102.000 | 15.00 | | |
| | | (E.P.) | | | wherein, the numbers in the left column of the table represent lens surfaces in sequential order counted from an object, r represents the curvature radius of a surface of a lens, d represents the distance between surfaces of lenses, υ represents the Abbe number, n represents the refracting power with respect to line d (λ=587.6 nm), the uppermost distance d represents the distance from the focal plane of the zoom lens to the first surface of the ocular, the lowermost distance d represents the distance from the final plane of the ocular to the eye-point (E.P.), $f_e$ represents the focal length of the ocular, and the magnification and the diopter are those when combined with the zoom objective lens.

* * * * *